United States Patent [19]

Richard

[11] Patent Number: 5,101,849
[45] Date of Patent: Apr. 7, 1992

[54] BAFFLE FOR A SEWAGE TANK AND METHOD OF INSTALLATION

[76] Inventor: James G. Richard, 20 Woodland Dr., Canton, Conn. 06019-2004

[21] Appl. No.: 601,503

[22] Filed: Oct. 23, 1990

[51] Int. Cl.⁵ .............................................. B01D 43/00
[52] U.S. Cl. .................................... 137/15; 137/590; 137/592; 210/519; 210/532.2
[58] Field of Search ................. 137/590, 592, 15; 220/86.1; 210/519, 532.2

[56] References Cited

U.S. PATENT DOCUMENTS

| | | | |
|---|---|---|---|
| Re. 32,312 | 12/1986 | Crates et al. | 210/532.2 |
| 2,384,994 | 9/1945 | Gutman et al. | 210/532.2 X |
| 3,426,903 | 2/1969 | Olecko | 210/532.2 X |
| 3,630,370 | 12/1971 | Quina | 210/532.2 X |
| 3,817,864 | 6/1974 | Carlson et al. | 210/532.2 X |
| 3,862,376 | 7/1974 | Carlson et al. | 210/532.2 X |
| 4,334,991 | 6/1982 | Beede | 210/532.2 X |
| 4,709,723 | 12/1987 | Sidaway et al. | 137/592 X |
| 4,772,389 | 9/1988 | Guibault | 210/532.2 X |
| 4,832,846 | 5/1989 | Gavin | 210/532.2 |
| 4,886,605 | 12/1989 | Hervé | 210/532.2 X |

*Primary Examiner*—John Rivell
*Attorney, Agent, or Firm*—St.Onge Steward Johnston & Reens

[57] ABSTRACT

A pipe baffle and installation assembly for a sewage tank is disclosed. The baffle comprises a corrugated polyethylene sheet having two circular ports which overlap when the sheet is folded prior to installation. The baffle is mounted on the interior of the sewage tank by positioning the overlapping ports over a sleeve housing the pipe, and is secured to the tank interior with an annular locknut that engages the sleeve. A method for installing the sleeve, the baffle and the locknut is described.

28 Claims, 6 Drawing Sheets

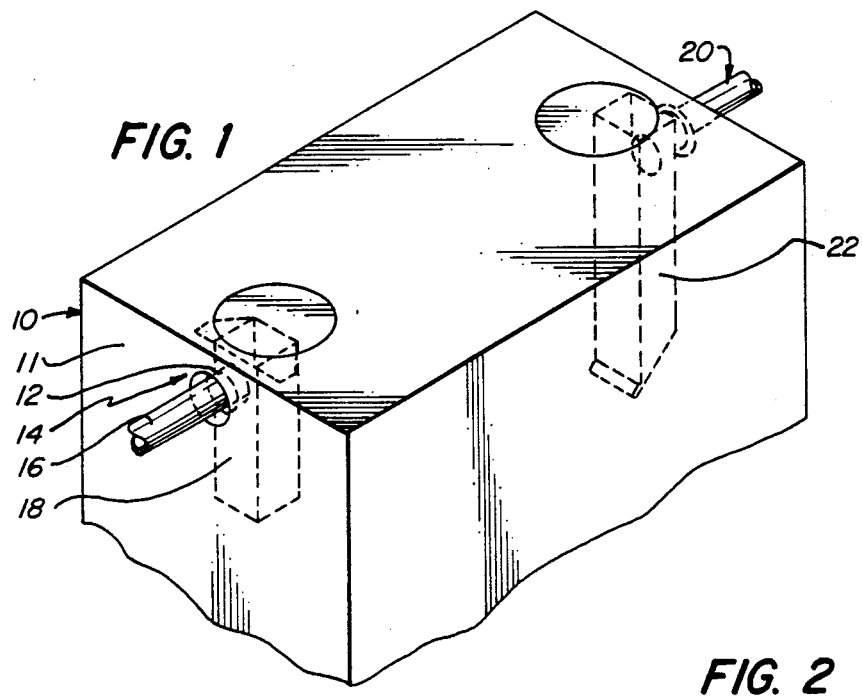
FIG. 1
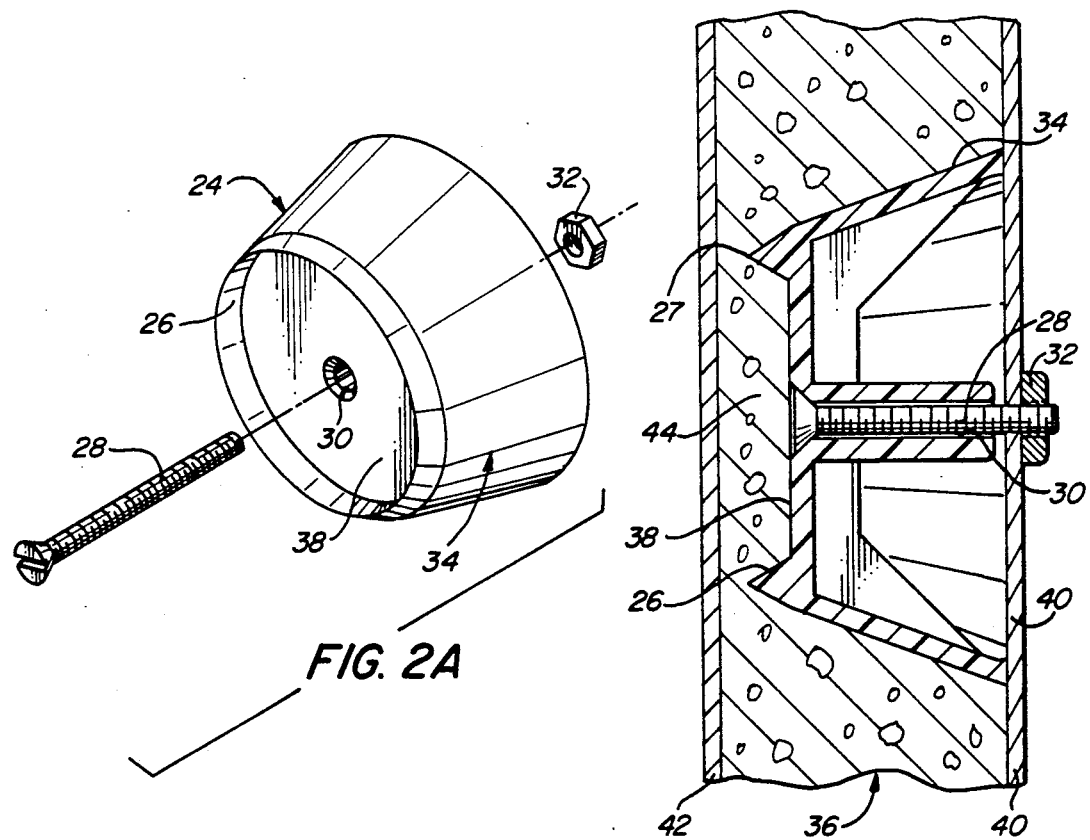
FIG. 2
FIG. 2A

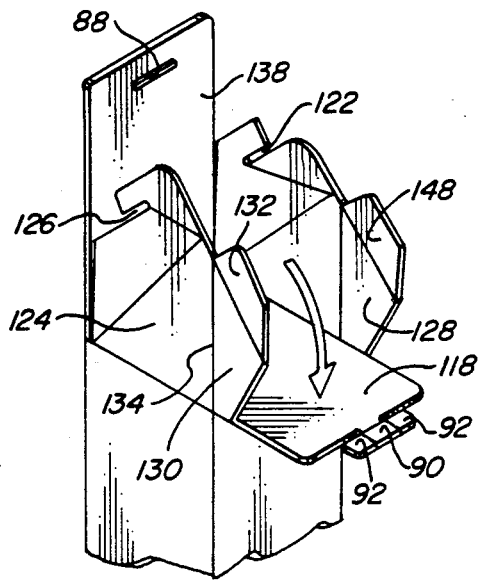
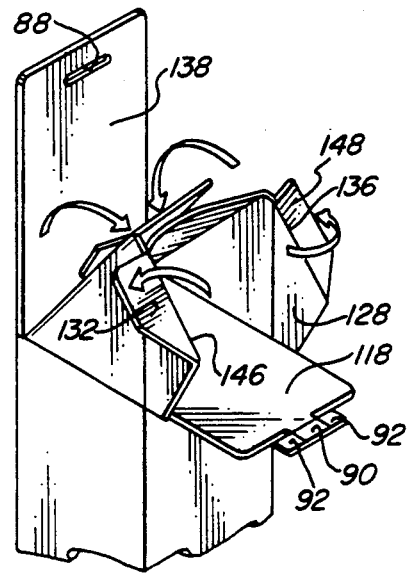
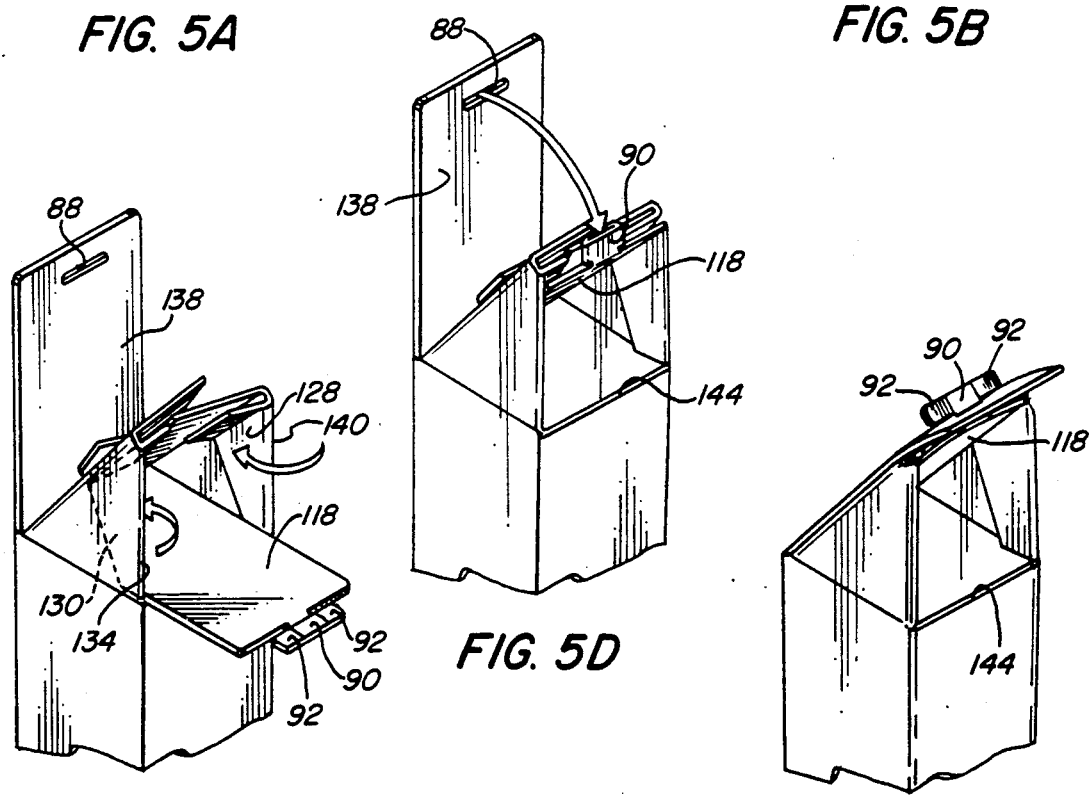
FIG. 5A
FIG. 5B
FIG. 5C
FIG. 5D
FIG. 5E

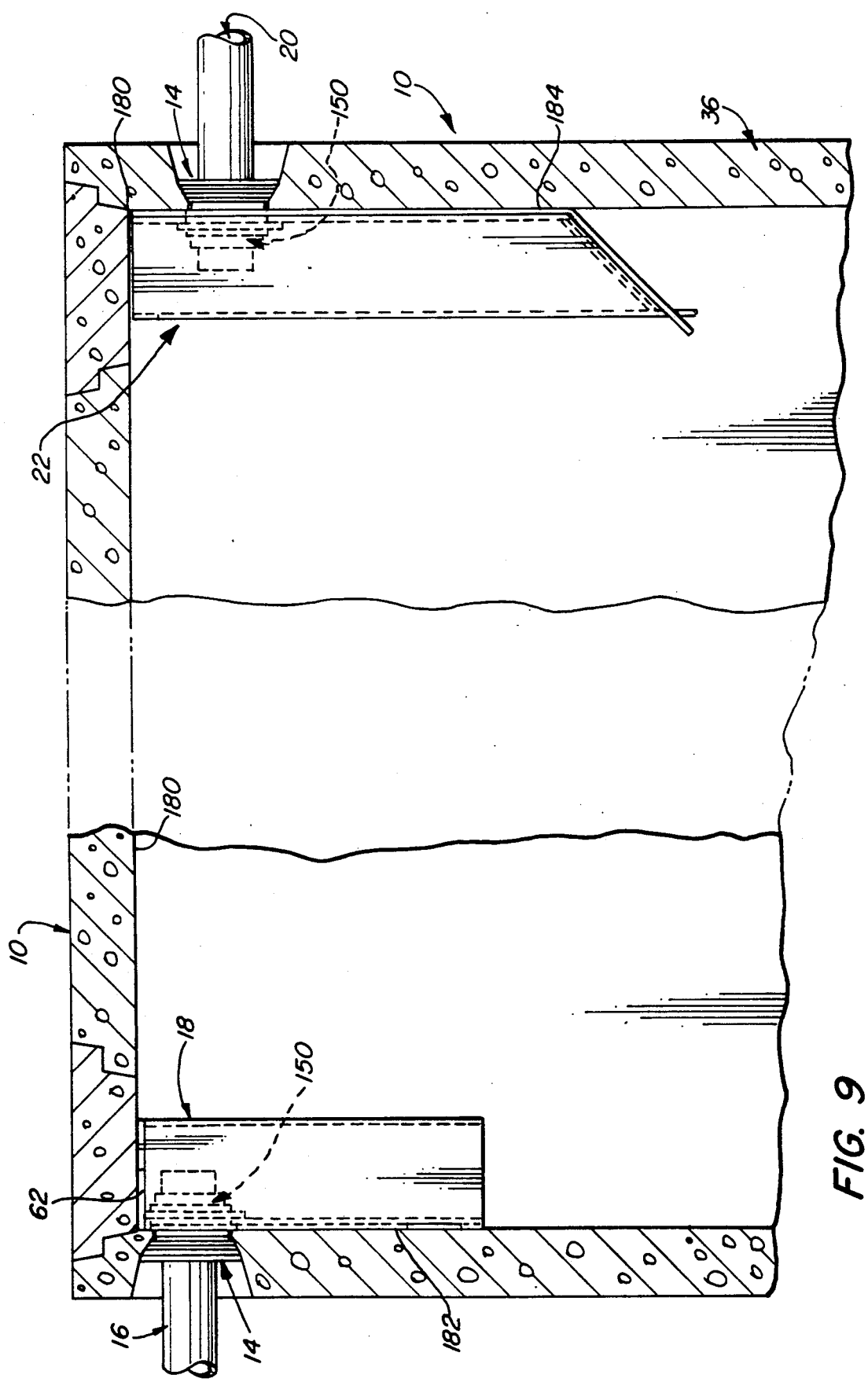

BAFFLE FOR A SEWAGE TANK AND METHOD OF INSTALLATION

BACKGROUND OF THE INVENTION

This invention relates to a pipe baffle and installation assembly for a sewage tank.

Private sewage disposal systems generally comprise a sewer line, a septic tank, and an absorption field. Sewage washed or flushed into the line enters the tank via one or more inlet pipes. The pipes, usually 4", may be cast-iron, solvent-welded plastic, self-sealing vitrified clay tile, tapered-joint fiber, or self-sealing cement-asbestos. The septic tank holds the solid matter of the sewage so that it may settle and be disintegrated by bacteria. The tank may be precast concrete, asphalt-coated steel, concrete block, redwood, clay tile, brick or plastic. The tank's outlet or outlets, lower than the inlet to keep sewage from backing up into the sewer line, deliver septic tank effluent to drainage lines or seepage pits. Drainage lines are laid in trenches and positioned so that septic tank effluent water can drain away; seepage pits are porous, open-bottomed tanks fed through lines like those in a trench-type absorption field.

Cesspools may take the place of septic tanks in private disposal systems. The difference between a cesspool and a septic tank is that a cesspool does not make any provision for the breakdown and treatment of sewage. Cesspools are simply collecting tanks that permit raw sewage to be leached into the ground.

Whatever the type of sewage disposal system, the inlet and outlet pipes to the tank may be baffled to vent the lines, prevent splashing, and keep scum from floating out.

SUMMARY OF THE INVENTION

It is an object of this invention to provide a new type of sewage tank pipe baffle and installation assembly. It is another object of this invention to provide a baffle that is inexpensive, lightweight, easy to install and easy to ship. It is a further object of this invention to provide a method of installing the baffle and installation assembly, preferably in a concrete septic tank.

These and other objects are accomplished by the present invention, which describes a pipe baffle comprising a columnar housing having walls contoured to mount on a tank interior. Preferably, the baffle is an extruded corrugated polyethylene sheet that can be shipped flat and then folded to form the housing. The baffle has two circular ports sized to fit a sleeve concentric to the pipe and installed at the pipe inlet or outlet, extending into the tank. The baffle ports are overlapped to align them, and fitted over the sleeve. An annular locknut having a bore substantially the same size as the pipe is attached to the sleeve to secure the baffle to the tank interior.

Methods for installing the baffles and for making inlet and outlet pipe openings in concrete containers are also disclosed.

BRIEF EXPLANATION OF THE FIGURES

FIG. 1 is a generalized sketch of two baffles installed in a tank.

FIG. 2 illustrates a form that can be used to make concrete tank pipe openings suitable for the baffle installation assemblies of this invention. After the concrete has hardened around the form, the portion of concrete behind the form can be knocked out to form a pipe opening.

FIG. 2A shows a perspective view of the form shown in FIG. 2.

FIGS. 5A–5E are exploded views of the folding for one end of the baffle of FIG. 4.

FIG. 9 illustrates inlet and outlet pipe baffles and installation assemblies secured to a tank interior.

DETAILED DESCRIPTION OF THE INVENTION

Figure 3A:
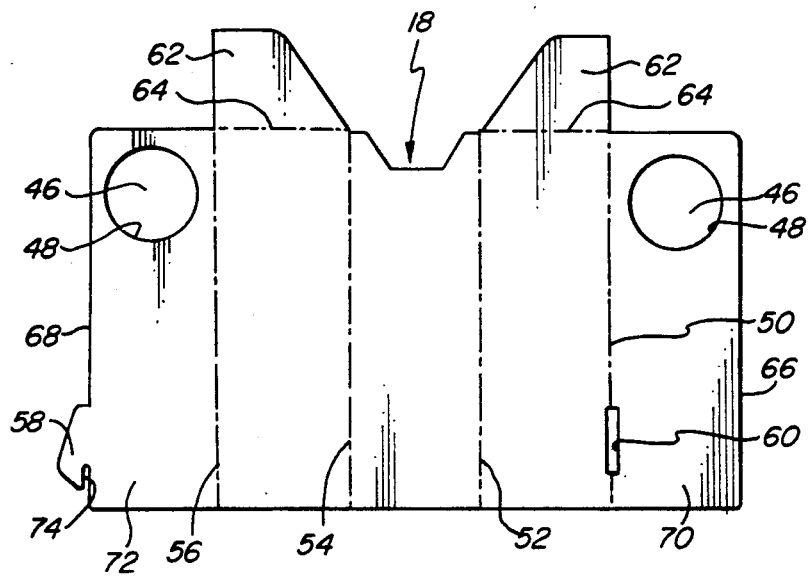
FIG. 3A shows an unassembled inlet baffle that is then folded as illustrated in FIGS. 3B and 3C prior to installation.

As illustrated in FIGS. 1 to 9, this invention describes a pipe baffle and installation assembly for a container having a pipe opening, a method of forming the opening, and a method for installing the baffle.

With reference to FIG. 1, container 10 has a pipe opening 12 in container wall 11 through which pipe 16 extends. Sleeve 14, concentric to the pipe and inserted in pipe opening 12, extends into the container interior so that baffle 18 can be mounted thereon (to be more particularly described below). A second baffle 22 is similarly mounted on the interior of container 10 around pipe 20 abutting the container interior at the side opposite 11.

Container 10 may be precast concrete, asphalt-coated steel, concrete block, redwood, clay tile, brick or plastic, or combinations of these materials. Concrete containers are preferred. The baffles and installation assemblies of this invention are especially suitable for sewage tanks, i.e., septic tanks, cesspools, seepage pits and the like. In one embodiment, a concrete septic tank is the preferred container.

Pipes 16 and 20 may be cast-iron, solvent-welded plastic, self-sealing vitrified clay tile, tapered-joint fiber, self-sealing cement-asbestos, or the like. Where the container is a sewage tank, the pipes are sewage pipes. Any type of sewage pipe may be employed in this embodiment, including, but not limited to, conventional 4" sewage pipes.

In concrete containers, opening 12 may be formed as illustrated in FIG. 2. Form 24 comprises a tapered, cylindrical housing 34 closed at the narrower end 38, and topped and surmounted at that end by an annular flange 26. Form 24 may be plastic, rubber, wood, a composition material, or the like; plastic is preferred. Circular end 38 has a bore 30 in the center. To mold the container wall 11 and opening 12 in it, retaining walls 40 and 42 are employed. Form 24 is mounted in retaining wall 40 by means of bolt 28 and nut 32. Concrete 36 is then poured into the cavity between retaining walls 40 and 42 and allowed to harden. The retaining walls and form 24 are removed, leaving concrete plug 44 in the space between end 38, flange 26, and retaining wall 42. Plug 44 is tapped out to form the opening in the container.

Flange 26 preferably includes a sharpened edge 27 that projects into the concrete and forms in the concrete an area of weakness. Edge 27 provides a fracture line that permits the plug 44 to be accurately and cleanly removed. The outer wall 29 of flange 26 preferably is a smooth continuation of the tapered housing 34.

Figure 3B:
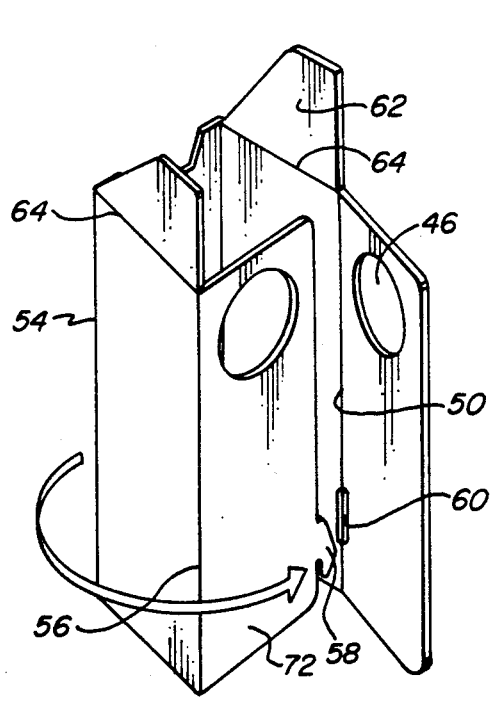
Figure 3C:
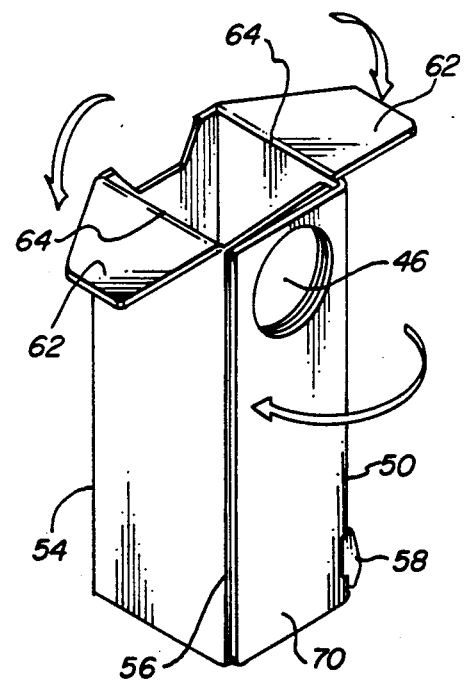

FIG. 3 illustrates a baffle of this invention that is especially adapted to function at the inlet pipe of a septic tank, cesspool, or seepage pit. This baffle comprises a deformable sheet 18 of semi-rigid material that may be stacked one on top of the next and shipped flat, and that can be folded along lines 50, 52, 54, 56 and 64. Sheet 18 may be plastic or any other suitable material; corrugated polyethylene is preferred. In this embodiment, the spaces between corrugations may serve as fold lines. In other embodiments, fold lines may be omitted or delineated on the sheets as marks, grooves, and the like. Sheet 18 has two circular ports 46 in sides 70 and 72. Sheet 18 is folded inward along fold lines 50, 52, 54, and 56 to overlap sides 70 and 72, align ports 46 and form a rectangular or square shaped housing as indicated. In so doing, edge 68 meets fold line 50 so that tab 58 having a notch 74 can be inserted in aperture 60 to help secure the housing. Flanges 62 are folded back along fold lines 64.

Figure 4A:
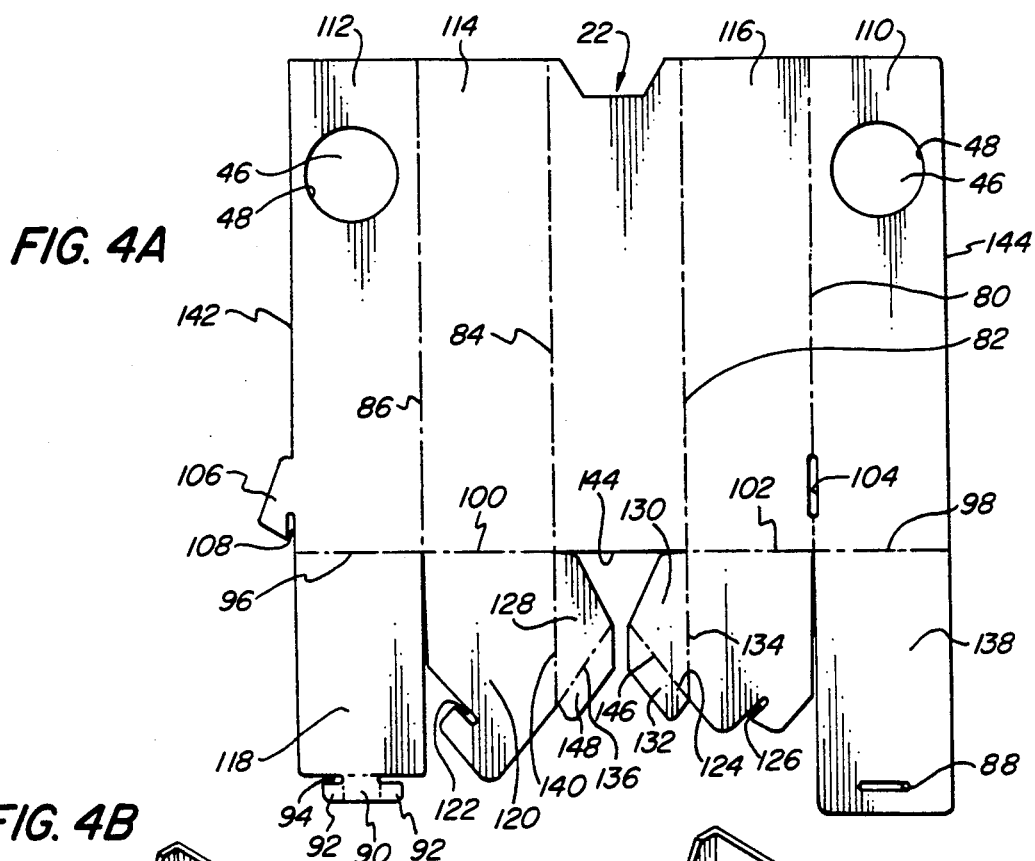
FIG. 4A shows an unassembled outlet baffle that is then folded as illustrated in FIGS. 4B and 4C prior to installation.
Figure 4B:
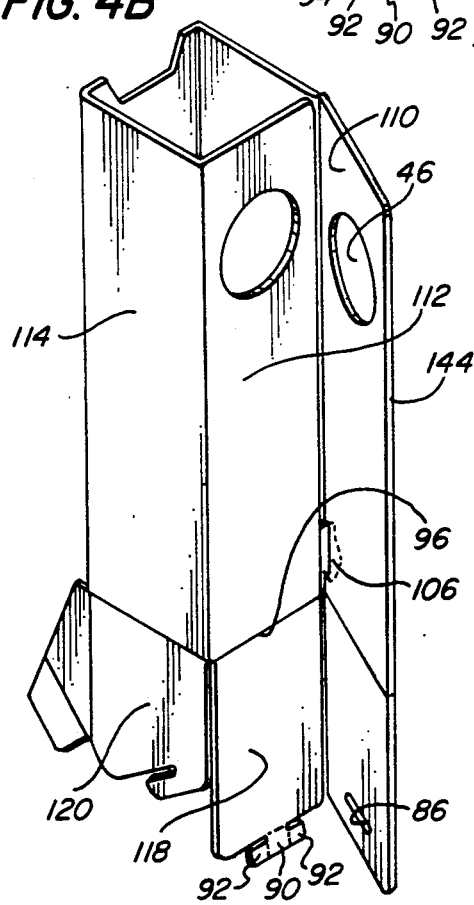
Figure 4C:
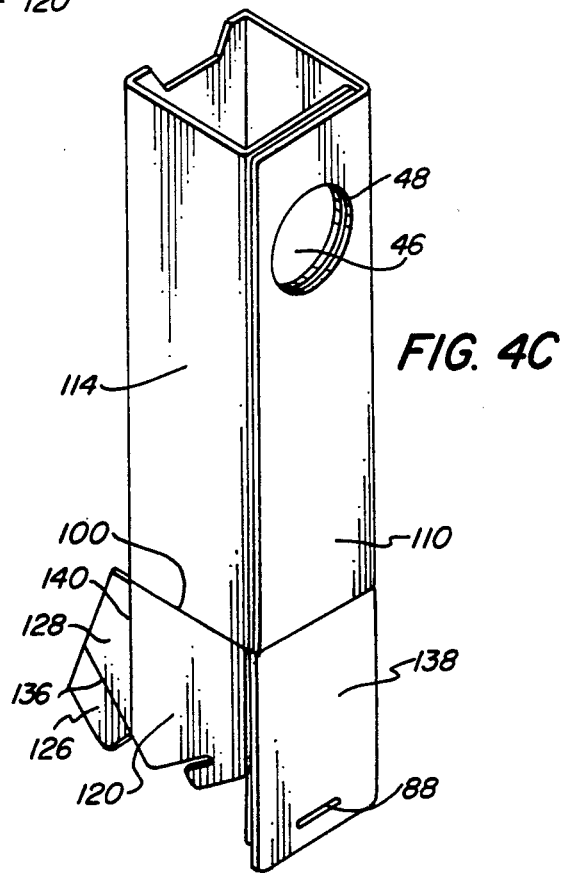

FIG. 4 illustrates a baffle of this invention that is especially adapted to function at the outlet pipe of a septic tank, cesspool, or seepage pit. This baffle comprises a deformable sheet 22 of semi-rigid material that can be folded along fold lines 80, 82, 84, and 86 to form a columnar housing. Like sheet 18, sheet 20 may be plastic or any other suitable material; corrugated polyethylene is preferred. In this embodiment, the spaces between corrugations may serve as fold lines. In another embodiment, fold lines may be omitted or delineated on the sheets as marks, grooves and the like. Sheet 22 has two circular ports 46 in sides 110 and 112. Sheet 22 is folded inward along fold lines 80, 82, 84, and 86 to overlap sides 110 and 112, align ports 46 and form a rectangular or square shaped housing as indicated. In so doing, edge 142 meets fold line 80 so that tab 106 having a notch 108 can be inserted into aperture 104 to help secure the housing.

The exploded view in FIG. 5 of the bottom of this baffle shows how end pieces 118 and 138 are folded and attached together in a sequence of manipulations labelled A to E. In A, end piece 118 is folded away from piece 138 along fold line 96 until it rests against edge 144. In B, end pieces 120 and 124 are bent inward along fold lines 100 and 102, respectively, and hooked together by intertwining notch 122 with notch 126. Also, ear tabs 148 and 132 are folded out along fold lines 136 and 146 as indicated. Then in C, triangular bottom panel portions 128 and 130 are folded inward along fold lines 140 and 134. In D, end piece 138 is folded along fold line 98 down toward end piece 118, which is folded up to meet it along fold line 96. Tab portions 92 at the end of end piece 118 are folded to overlap one another and abut central tab portion 90. Finally, in E, the entire folded tab is inserted in slot 88 so that tab portions 92 may be unfolded to secure the tab in the slot.

Figure 6:
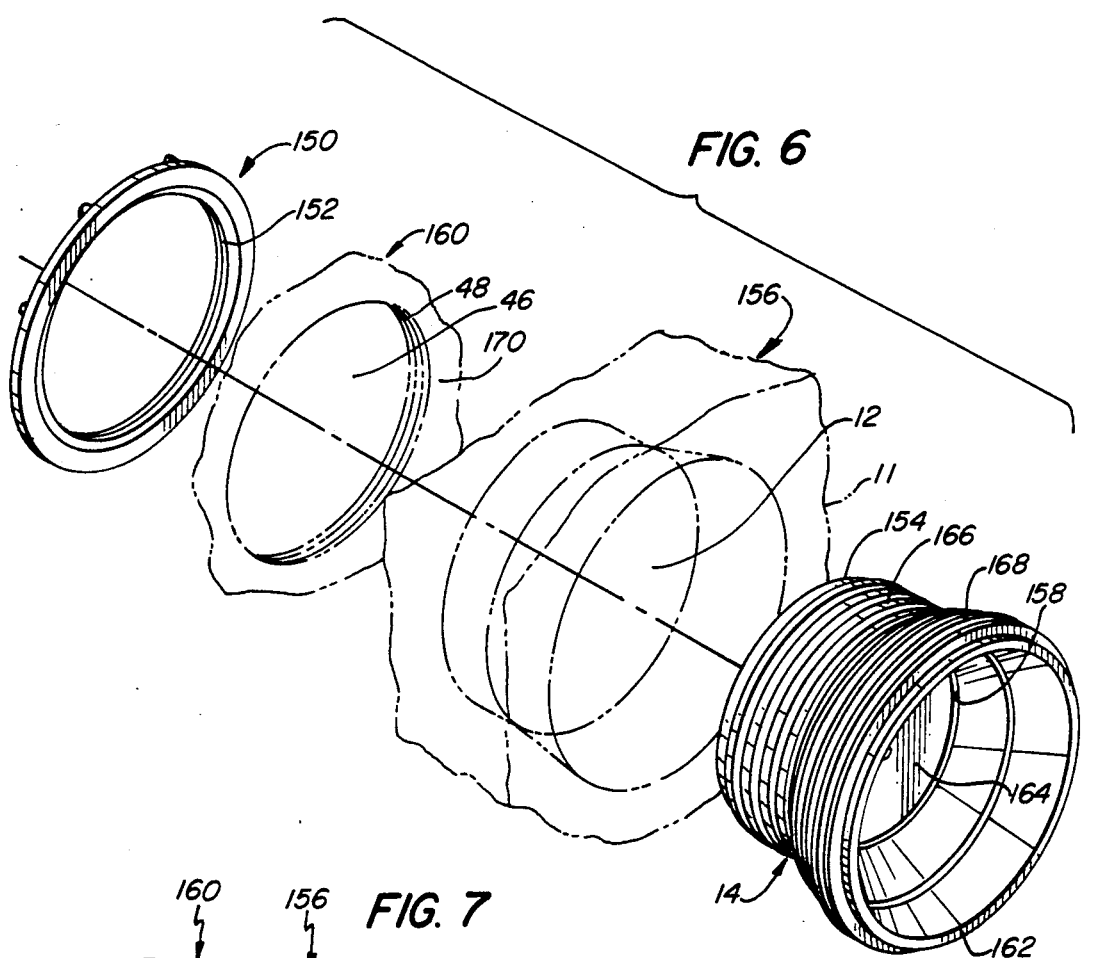
FIG. 6 depicts a sleeve and locknut comprising an installation assembly used to mount a baffle in a tank.

FIG. 6 shows a sleeve 14 and locknut 150 comprising an installation assembly used to mount pipe baffles in a container (such as container 10 in FIG. 1). Sleeve 14 is sized to fit the pipe opening 12 in the container, such as the tapered pipe opening illustrated in FIG. 2 discussed above. Sleeve 14 and locknut 150 may be of any suitable material such as plastic, rubber, metal, cork, or the like; because of its lightweight ruggedness and corrosion resistance, plastic is preferred. Annular locknut 150 has a bore substantially the same size as the pipe so it can extend therethrough. Sleeve 14 is inserted into pipe opening 12 from the outside through the container wall 156 and through port 46 of baffle 160. Locknut 150, which has attachment means at 152 reciprocal to the sleeve's at 154 so that the nut may engage the sleeve, is then seated on the sleeve. The attachment means may be any known to those skilled in the art, such as, for example, reciprocal screw threads, reciprocal ratchet teeth, hooks, clamps, or the like.

Figure 7:
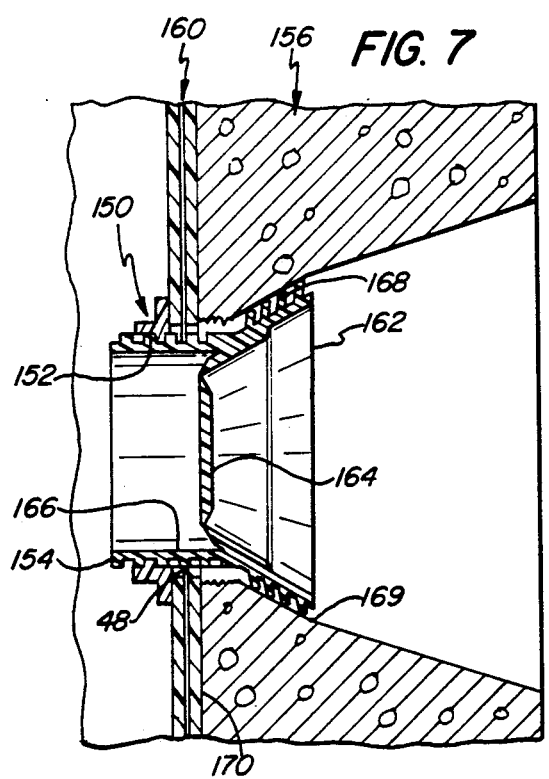
FIG. 7 shows the sleeve of FIG. 6 installed in a concrete tank opening prior to the insertion of a pipe.

As illustrated in FIG. 7, in the practice of this invention, the rims 48 around circular ports 46 of the baffles are sized to fit the cylindrical portion 166 of sleeve 14. Sleeve 14 is inserted into the pipe opening 12 so that attachment means 154 at the end of cylindrical portion 166 is inside the container interior. Circular ports 46 in baffle 160 are positioned to interface with the openings, fit over the sleeve and abut the container interior so that locknut 150 may engage sleeve 14 by meshing attachment means 152 with 154 and secure baffle face 170 snugly to the container interior. Optional ridges 168 on the exterior of sleeve 14 between cylindrical portion 166 and rim 162 helps anchor the sleeve 14 and baffle assembly and seal the sleeve 14 with respect to the tapered concrete wall 169.

Figure 8:
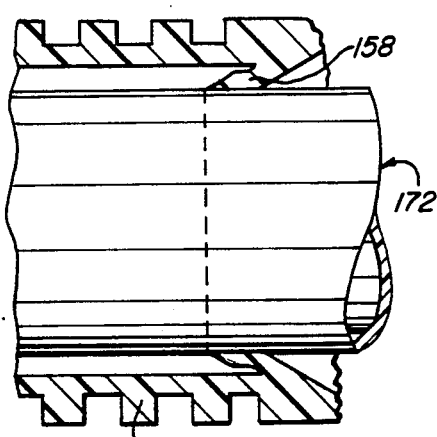
FIG. 8 shows a pipe inserted in the sleeve of FIG. 6.

After the baffle, sleeve and locknut have been installed, face 164 of sleeve 14 may be punched out and a pipe 172 inserted through cylindrical portion 166 as depicted in FIG. 8. Preferably, face 164 is sized to fit the pipe, and interior rim 158 concentric to the pipe which remains along the circumference of face 164 after it is punched out helps lock the pipe in place.

FIG. 9 illustrates a completed assembly of one inlet baffle 18 for pipe 16 and one outlet baffle 22 for pipe 20 installed in a septic tank, container 10. As discussed above, the outlet is positioned lower than the inlet to keep sewage from backing up into the sewer line. Both baffles 18 and 22 abut the top of the tank 180; flanges 62 on the top of baffle 18 help stabilize the assembly. Baffle 18 abuts interior wall 182; baffle 22 abuts interior wall 184. Both are attached with sleeve members 14 engaged to annular locknuts 150 as shown.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A pipe baffle and installation assembly for a container having a pipe opening which comprises:
   a sleeve sized to fit the opening and the pipe, and having attachment means extending into the container interior;
   a baffle comprising a columnar housing having walls contoured to mount on the container interior at the opening, said baffle having two circular ports sized to fit the sleeve member at the end extending into the container, the ports being positioned on the housing such that, on installation over the sleeve, they align one another and abut the container interior; and
   an annular locknut having a bore substantially the same size as the pipe so it can extend therethrough, and attachment means reciprocal to that on the sleeve such that the nut may engage the sleeve, seat snugly thereon, and secure said baffle to the container interior.

2. A baffle and installation assembly according to claim 1 wherein said container is selected from the group consisting of septic tanks, cesspools, and sewage seepage pits.

3. A baffle and installation assembly according to claim 2 wherein said container is concrete.

4. A baffle and installation assembly according to claim 1 wherein said baffle comprises a deformable sheet of semi-rigid material that can be folded to form the columnar housing.

5. A baffle and installation assembly according to claim 4 wherein said baffle comprises corrugated polyethylene.

6. A baffle and installation assembly according to claim 4 wherein said baffle has fold lines to facilitate folding, and tabs and reciprocal slots that mesh together to shape the columnar housing.

7. A baffle and installation assembly according to claim 1 wherein said sleeve and locknut are plastic.

8. A baffle and installation assembly according to claim 7 wherein said sleeve is tapered.

9. A baffle and installation assembly according to claim 8 wherein said sleeve further comprises an interior rim concentric to the pipe and exterior ridges.

10. A baffle and installation assembly according to claim 1 wherein said sleeve and locknut attachment means are complementary threads comprising a screw assembly.

11. A baffle and installation assembly for a pipe to a septic tank having a recessed tapered opening at the pipe which comprises:
  a sleeve sized to fit the recessed tapered opening and the pipe, and having attachment means on the end extending into the tank interior;
  a baffle comprising a columnar housing, said baffle having two circular ports sized to overlap, align, and fit over the sleeve end extending into the tank interior and abut the tank interior; and
  an annular locknut having a bore substantially the same size as the pipe extending therethrough, and attachment means reciprocal to the sleeve, such that the nut may engage the sleeve, seat snugly thereon, and secure said baffle to the tank interior.

12. A baffle and installation assembly according to claim 12 wherein said baffle comprises an extruded corrugated polyethylene sheet that can be folded to form the columnar housing.

13. A baffle and installation assembly according to claim 12 wherein said baffle has fold lines, tabs and slots to facilitate folding and shaping.

14. A baffle and installation assembly according to claim 13 further comprising flanges at the top end, which extend to the underside of the tank top to stabilize the baffle.

15. A baffle and installation assembly according to claim 11 wherein said sleeve and locknut are plastic and said sleeve and locknut attachment means comprise a screw assembly.

16. A baffle for a pipe to a container having a pipe opening comprising a columnar housing having walls contoured to rest against the container interior, said walls having two circular ports sized to fit the pipe and positioned so that the ports may be overlapped and aligned when fitted over the pipe.

17. A baffle according to claim 16 comprising a deformable sheet of semi-rigid material that can be folded to form the columnar housing.

18. A baffle according to claim 17 further comprising plastic.

19. A baffle according to claim 18 comprising polyethylene.

20. A baffle according to claim 19 further comprising corrugations arranged such that the sheet can be folded between corrugations.

21. A baffle according to claim 20 further comprising tabs and slots that engage to shape the columnar housing.

22. A baffle according to claim 20 wherein the columnar housing has a cross-sectional shape selected from the group consisting of a square and a rectangle.

23. A baffle according to claim 17 further comprising flanges at the one end, which extend to rest against one side of the container to stabilize the baffle.

24. A method for baffling inlet and outlet pipes to a concrete septic tank which comprises forming the septic tank with cylindrical inlet and outlet openings; inserting plastic sleeves having attachment means into said openings concentric to the pipes; installing rectangular or square hollow baffles vertically into the tank positioned over said openings, said baffles having two circular ports the size of the pipes which overlap and align to fit over the pipes and interface with the openings; and securing the baffles with annular locknuts that fasten to the sleeve attachment means.

25. A method according to claim 24 wherein said baffles are deformable plastic sheets of semi-rigid material that are folded to overlap and align the circular ports prior to attachment.

26. A method according to claim 25 wherein said baffles comprise polyethylene.

27. A method according to claim 24 wherein said openings and sleeves are tapered.

28. A method according to claim 24 wherein said sleeves and locknuts are plastic and said attachment means is a screw assembly.

* * * * *